Patented July 12, 1932

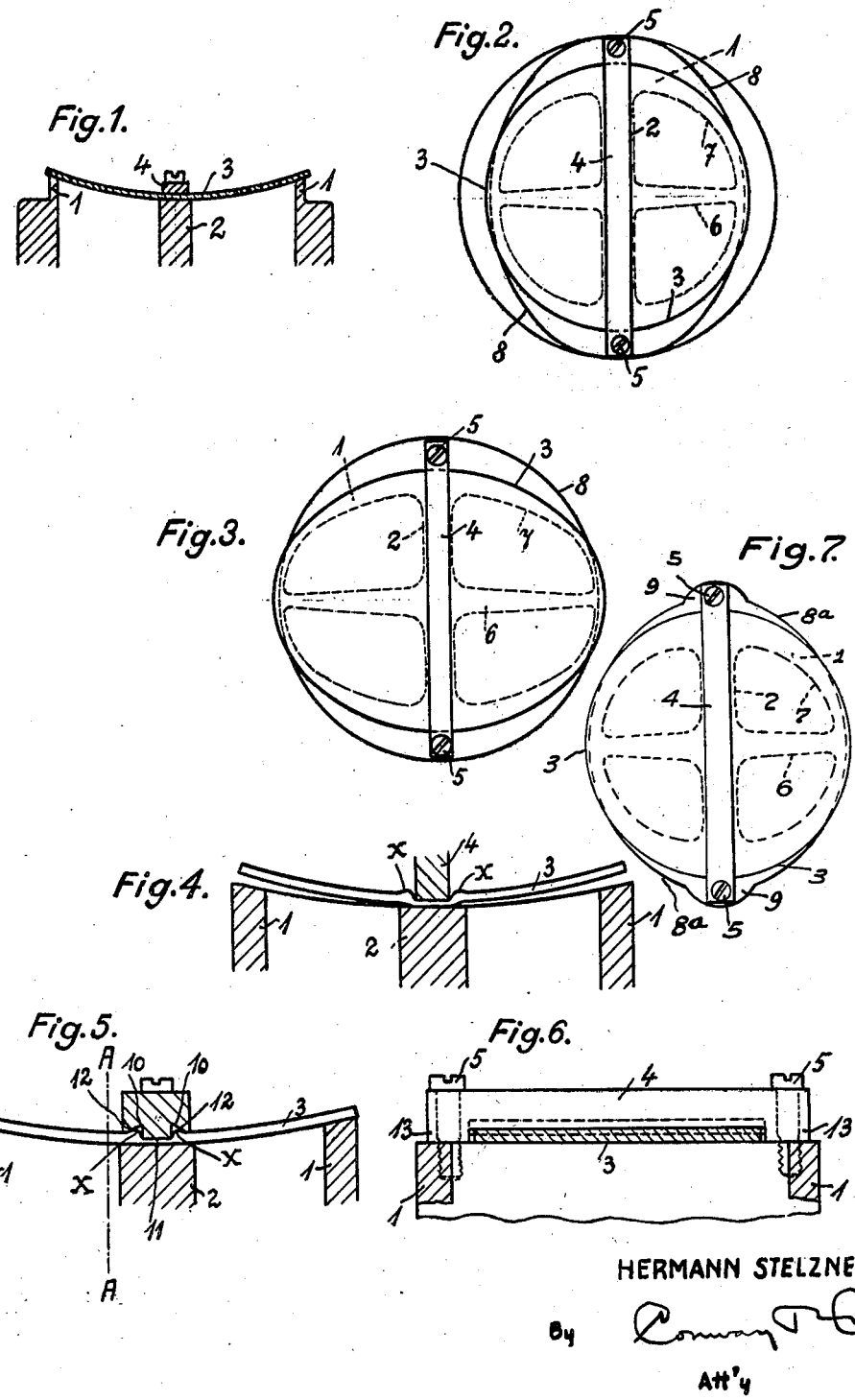

1,867,478

UNITED STATES PATENT OFFICE

HERMANN STELZNER, OF LUBECK, GERMANY, ASSIGNOR TO FIRM DRÄGERWERK, HEINR. & BERNH. DRÄGER, OF LUBECK, GERMANY

NONRETURN VALVE FOR BREATHING APPLIANCES

Application filed June 7, 1928, Serial No. 283,703, and in Germany August 12, 1927.

Non-return valves for breathing appliances must fulfil three requirements; the resistance they offer to the air passing through them must be as small as possible, they must close absolutely air-tight and on air passing through them they must not rattle or produce rattling noises. Spring pressed valves are subject to rattling since when closed tightly they have a comparatively high resistance. When the load of the spring is reduced the tightness is lost and frequently a rattling is set up by the vibration of the valve proper.

The object of the present invention is to construct a non-return valve for breathing appliances, which fulfils all the said requirements. The valve, which consists of an elastic diaphragm curved inwardly, as is well known per se, bears on an annular seat fitting to the curvature of the diaphragm, the elastic diaphragm being originally flat and being fastened at a place within the valve seat and below its rim. The diaphragm is supported throughout by a cross-stay extending across the seat, the bearing surface of the valve seat merging into the stay at its ends and being flush therewith, and the diaphragm assuming a cylindrical curvature. The attachment of the diaphragm to the cross-stay is carried out by a clamping bar, the fastening means of which are situated outside of the periphery of the diaphragm. To insure equal specific bearing pressure of the diaphragm on all parts of the vave seat, the latter is so constructed, that the radial breadth of its bearing surface diminishes with the increasing distance from the cross-stay.

To avoid a deformation of the diaphragm by the clamping bar at the point of contact in case the diaphragm is made of a comparatively soft material, according to a further feature of the invention, the face of contact of the clamping bar with the diaphragm may be bordered by grooves and may project below the outer bordering edges or ribs of these grooves. Should the fastening means of the clamping bar be situated on the cross-stay running across the valve seat outside of the periphery of the diaphragm, the ends of the clamping bar should be spaced from the cross-stay by projections, washers or the like of such height that the lower edges of the bordering ribs are spaced from the cross-stay by a distance equal to the thickness of the diaphragm.

Fig. 1 is a section of a valve constructed according to the invention by way of example.
Fig. 2 is a plan view of the valve.
Fig. 3 is a plan view of a modified valve.
Fig. 4 is a section of a valve made of soft material, the diaphragm being deformed by the clamping bar.
Fig. 5 is a section of a valve, means being shown to avoid said deformation.
Fig. 6 is a section at right anges to that shown in Fig. 5.
Fig. 7 is a plan view of another form of the invention.

In the construction shown in Fig. 1 the opening of the annular valve seat 1 is traversed or bridged by a cross-stay 2, which is situated lower than the highest parts of the edges of the valve seat 1. An elastic diaphragm 3 of rubber or other elastic material, for instance leather having a layer of a varnish containing cellulosic derivatives applied by projecting or dipping or even applied loosely, is held in place on the cross-stay 2 by the aid of a clamping bar 4, the screws 5 lying outside the diaphragm 3. The diaphragm in its closed position, shown in Fig. 1, bearing against the cross stay 2 through its full length, has the shape of a part of a cylinder bent inwardly and by this curvature receives the requisite yielding pressure for closing. The bearing surface of the valve seat contacting with the diaphragm is accommodated to this curvature, and at the ends of the stay 2 merges therewith. As the closing pressure of the diaphragm diminishes in a direction perpendicular to the cross bar 4, that is, proportionately to the distance from the bar, the breadth of the bearing surface should diminish in proportion to the increasing distance from the cross bar so as to give a uniform specific bearing pressure. That is, the total pressure exerted by the valve along a line close to the cross bar is greater than along a line further from the bar, but since the area upon which this pressure is exerted that is, the seating area, is likewise decreased, the pressure per unit area of the valve on the valve seat remains substantially the same at all distances from the valve.

In the construction shown in Fig. 2 this is ensured by giving the cross section of the opening 7 of the valve seat 1, which is traversed by a second cross stay 6 at right angles to the first cross-stay 2, an oval or elliptical shape, the longer axis of the ellipse coinciding with the center line of the cross stay 6.

The construction shown in Fig. 3 differs from that of Fig. 2 only in the diaphragm 3 being elliptical in outer contour. The shorter axis of the elliptical opening 7 of valve seat 1 coincides with the center line of the cross stay 2, and is of less length than the cross stay. The outer contour 8 of the valve seat is circular in outline.

In both constructions a doubling or folding of the diaphragm is prevented, since it is stretched on both sides of the cross stay equally.

Now it may happen when the diaphragm is made of a comparatively soft material that the clamping bar may under some circumstances deform the diaphragm at the places where it contacts therewith to such an extent, that the valve will not close fully on its seat.

As may be gathered from Fig. 4 it may occur that the clamping bar 4 makes an impression into the soft material of the diaphragm and thus thickened parts or ridges $x$ arise on both sides of the clamping bar, causing the edges of the diaphragm 3 to stand out away from the seat 1.

This drawback is removed by the constructions shown in Figs. 5 and 6, wherein the underface of the clamping bar 4 is not flat but, in contradistinction to the construction shown in Fig. 4, is provided with V-shaped grooves 10 on each side of the main surface 11 of the clamping bar 4 which contacts with the diaphragm. These grooves have ribs 12 on the sides running up to the face of contact 11. When the bolts 5 for connecting the clamping bar 4 with the cross stay bridging the opening of the seat are outside the periphery of the diaphragm, it is preferred to provide feet 13 at the ends of the clamping bar 4, or washers or the like for supporting it on the cross-stay 2 in such way as to permit the lower edges of the bordering ribs 12 to be spaced from the cross-stay by a distance equal to the thickness of the diaphragm. It follows that in such a case the projecting surface 11 may be pressed into the diaphragm, but not the lower edges of the bordering ribs 12, and that, if ridges or thickened parts are formed, they may enter the grooves 10 and thus a gap between the rim of the diaphragm and the seat will be prevented, because the ribs 12 on both sides of the ridges $x$ bear on the surface of diaphragm and thus hold it down. In the form shown in Fig. 7, a modified embodiment of the form shown in Fig. 2 is disclosed. This form is adapted to save material by making the periphery of the valve seat substantially circular as indicated at 8$a$ and by providing this circular seat with lugs 9 to which the ends of the clamping bar are attached by the bolts 5.

I claim:—

1. A non-return valve comprising an annular valve seat, and an elastic diaphragm secured at points within said seat and below its rim, the bearing surface of said diaphragm upon said valve seat decreasing with the increasing distance from the points of attachment whereby the pressure per unit area of said diaphragm on said valve seat is substantially the same at varying distances from the point of attachment.

2. A non-return valve comprising an annular valve seat, a crossbar bridging the seat below its highest point, an elastic diaphragm resting on said crossbar, and a clamping bar adapted to clamp said diaphragm on said crossbar, said clamping bar being secured to said valve seat outside the periphery of said diaphragm only, said valve seat having the form of a portion of a cylinder having its axis at right angles to the axis of the valve.

3. A non-return valve comprising an annular valve seat, a crossbar bridging the seat below its highest point, an elastic diaphragm resting on said crossbar, and a clamping bar adapted to clamp said diaphragm on said crossbar, said clamping bar being secured to said valve seat outside the periphery of said diaphragm only, the bearing surface of said diaphragm on said valve seat decreasing with the increasing distance from said crossbar.

4. A non-return valve comprising an annular valve seat, a crossbar bridging the seat below its highest point, an elastic diaphragm resting on said crossbar, and a clamping bar adapted to clamp said diaphragm on said crossbar, said clamping bar being secured to said valve seat outside the periphery of said diaphragm only, said valve seat being elliptical, and a second crossbar at right angles to the first said crossbar.

5. A non-return valve comprising an annular valve seat, a crossbar bridging the seat below its highest point, an elastic diaphragm resting on said crossbar, and a clamping bar adapted to clamp said diaphragm on said crossbar, said clamping bar being secured to said valve seat outside the periphery of said diaphragm only, said diaphragm comprising a sheet of leather coated with varnish containing cellulosic derivatives.

6. A non-return valve comprising an annular valve seat, a crossbar bridging the seat below its highest point, an elastic diaphragm resting on said crossbar, and a clamping bar adapted to clamp said diaphragm on said crossbar, said clamping bar being secured to said valve seat outside the periphery of said diaphragm only, said clamping bar having grooves on the lower side thereof, and ridges on the outer sides of said grooves adapted to exert a pressure on said diaphragm.

7. A non-return valve comprising an annular valve seat having the form of a portion of a cylinder having its axis at an angle to the axis of the valve, a crossbar bridging said valve seat centrally thereof in a direction parallel to the axis of the cylinder, a diaphragm of resilient material carried by said crossbar and a clamping bar lying on said diaphragm and secured to said valve seat at points outside of the periphery of the diaphragm only, the bearing surface of said diaphragm on said valve seat decreasing with increasing distance from said crossbar.

8. A non-return valve comprising an annular valve seat having the form of a portion of a cylinder having its axis at an angle to the axis of the valve, a crossbar bridging said valve seat centrally thereof in a direction parallel to the axis of the cylinder, a diaphragm of resilient material carried by said crossbar, a clamping bar lying on said diaphragm and secured to said valve seat at points outside of the periphery of the diaphragm only, and means for spacing said clamping bar from said crossbar by a distance equal to the thickness of said diaphragm.

9. A non-return valve comprising an annular valve seat having the form of a portion of a cylinder having its axis at an angle to the axis of the valve, a crossbar bridging said valve seat centrally thereof in a direction parallel to the axis of the cylinder, a diaphragm of resilient material carried by said crossbar and a clamping bar lying on said diaphragm and secured to said valve seat at points outside of the periphery of the diaphragm only, said clamping bar having grooves in the lower side thereof.

10. A non-return valve comprising an annular valve seat having the form of a portion of a cylinder having its axis at an angle to the axis of the valve, a crossbar bridging said valve seat centrally thereof in a direction parallel to the axis of the cylinder, a diaphragm of resilient material carried by said crossbar, a clamping bar lying on said diaphragm and secured to said valve seat at points outside of the periphery of the diaphragm only, and means on said clamping bar to press said diaphragm against said valve seat.

11. A non-return valve comprising an annular valve seat having the form of a portion of a cylinder having its axis at an angle to the axis of the valve, a crossbar bridging said valve seat centrally thereof in a direction parallel to the axis of the cylinder, a diaphragm of resilient material carried by said crossbar, a clamping bar lying on said diaphragm and secured to said valve seat at points outside of the periphery of the diaphragm only, and a second crossbar at right angles to said first crossbar, the bearing surface of said diaphragm on said valve seat decreasing with the increasing distance from said first crossbar, said clamping bar having grooves on the lower side thereof.

In testimony whereof I have signed my name to this specification.

HERMANN STELZNER.